US006634747B1

(12) United States Patent
Atkins et al.

(10) Patent No.: US 6,634,747 B1
(45) Date of Patent: Oct. 21, 2003

(54) SAMPLE INDICATOR LENS

(75) Inventors: Barry L. Atkins, Chicago, IL (US); Michael H. Quinn, Valparaiso, IN (US)

(73) Assignee: Novartis AG, Basel (CH)

( * ) Notice: Subject to any disclaimer, the term of this patent is extended or adjusted under 35 U.S.C. 154(b) by 72 days.

(21) Appl. No.: 09/589,478

(22) Filed: Jun. 7, 2000

(51) Int. Cl.$^7$ ................................................. G02C 7/04
(52) U.S. Cl. .................... 351/160 R; 351/162; 351/177
(58) Field of Search .................... 351/160 R, 160 H, 351/161, 162, 177

(56) References Cited

U.S. PATENT DOCUMENTS

| | | | |
|---|---|---|---|
| 3,657,085 A | 4/1972 | Hoffmeister et al. | 204/157 |
| 4,039,827 A | 8/1977 | Zdrok et al. | 250/271 |
| 4,193,671 A | 3/1980 | Erickson et al. | 351/160 |
| 4,194,814 A | 3/1980 | Fischer et al. | 351/160 |
| 4,268,133 A | * 5/1981 | Fisher et al. | 351/161 |
| 4,525,044 A | 6/1985 | Bauman | 351/160 |
| 4,559,059 A | * 12/1985 | Su | 351/162 |
| 4,582,402 A | 4/1986 | Knapp | 351/162 |
| 4,648,932 A | 3/1987 | Bailey | 156/276 |
| 4,704,017 A | 11/1987 | Knapp | 351/177 |
| 4,720,188 A | 1/1988 | Knapp | 351/177 |
| 4,968,063 A | 11/1990 | McConville et al. | 283/72 |
| 5,018,830 A | 5/1991 | Krop | 359/536 |
| 5,062,701 A | * 11/1991 | Drazba et al. | 351/160 R |
| 5,244,470 A | 9/1993 | Onda et al. | 8/507 |
| 5,302,978 A | 4/1994 | Evans et al. | 351/162 |
| 5,414,477 A | 5/1995 | Jahnke | 351/162 |
| 5,467,149 A | 11/1995 | Morrison et al. | 351/162 |
| 5,560,970 A | 10/1996 | Ludeb ühl | 428/41.9 |
| 5,641,437 A | 6/1997 | Williams et al. | 264/2.5 |
| 5,936,704 A | 8/1999 | Gabrielian et al. | 351/160 |
| 5,936,705 A | 8/1999 | Ocampo et al. | 351/162 |
| 6,001,510 A | 12/1999 | Meng et al. | 430/1 |
| 6,024,448 A | 2/2000 | Wu et al. | 351/160 |

FOREIGN PATENT DOCUMENTS

| | | |
|---|---|---|
| EP | 0 472 496 A2 | 2/1992 |
| WO | WO 84/03569 | 9/1984 |

OTHER PUBLICATIONS

European Search Report dated Aug. 14, 2001, for corresponding European application No. EP 01 11 3751.

* cited by examiner

Primary Examiner—Jordan M. Schwartz
(74) Attorney, Agent, or Firm—Rob Gorman; Richard Gearhart; R. Scott Meece (57) ABSTRACT

Contact lenses with sample indicator marks are disclosed. Also disclosed are methods of marking and use of contact lenses with indicator marks.

8 Claims, 7 Drawing Sheets

SAMPLE INDICATOR LENS

FIELD OF THE INVENTION

This invention relates to contact lens manufacturing and the lenses made thereby, and in particular to contact lenses with marks thereon indicating the lenses are samples, and a method of manufacturing lenses with indicator markings.

BACKGROUND

Colored contact lenses have been a commercial success. Acceptance by consumers has been so great that many variations of lenses and processes for making such lenses have been devised and patented. Examples of patents in this field include U.S. Pat No. 4,582,402, U.S. Pat. No. 5,720,188, U.S. Pat. No. 5,414,477, and U.S. Pat. No. 5,936,705. These patents disclose articles of manufacture and methods of making such contact lenses. Success has gone beyond colored lenses and now extends to lenses with several colors and designs beyond mere color.

The desirability and novelty of these items has led to difficulty in controlling the distribution of samples. In particular, the sample items are sometimes sold or diverted, rather than being used as samples for the customer. Samples are typically distributed in order to allow customers or potential customers to view the cosmetic effect before they purchase the lenses. In addition, the customer may have the opportunity to view several colors or designs before making a choice. However, there are several ways for the lenses to fall into misuse. Sample lenses may be sold to a customer, rather than used as samples. The lenses may be diverted to another seller, who may not be an authorized customer of the contact lens manufacturer, and who may violate the manufacturer's selling, support and safety requirements.

The lenses may be diverted to a seller who sells them for a price lower than the manufacturer's authorized sellers. The lenses may be illegally diverted into the hands of someone who dispenses the lens without a prescription. The lenses may be illegally smuggled into another country where the lenses are not approved by the appropriate health authorities. These latter concerns are highly important since they affect legal liability and public health.

Many solutions have been attempted to solve these problems. Marking the packages with sample indicators has not solved the problem. Warnings that sharing of contact lenses may lead to the spread of microorganisms have not helped. The problem of the unauthorized use of sample lenses will only become greater, as more varieties of lenses, colors and designs become available. In addition, while there is a greater problem with colored lenses, the problem is also applicable to non-colored lenses, that is, lenses that are clear rather than colored. What is needed is a contact lens that will discourage the widespread unauthorized distribution and use of samples, but which samples will still function for their intended purpose, that is, of allowing a customer or potential customer to sample the lenses.

BRIEF SUMMARY

In one aspect the invention is a contact lens on which a sample indicator is imprinted. The sample indicator may comprise the word or words "Demo", "Sample", "Model", "Not for Sale", or "Demonstration Only". The advantage of such sample lenses is that the lens itself is fully functional for all purposes of a sample lens, except for ordinary daily wear. The sample lens may not be suitable for that purpose, because the sample indicator may well be conspicuous to another person viewing the eyes of the wearer of the sample lens. In particular, most colored contact lenses are colored in the area of the lens superimposed on the iris of the wearer's eye. The sample indicator is therefore most conspicuous when it is imprinted in the lens periphery, that is, the area between the outer edge of the lens and the area superimposed on the iris of the wearer's eye. This is applicable to both colored and non-colored lenses.

At the same time, this placement of the sample indicator has very few disadvantages. No marking is required in the area of the lens superimposed over the pupil of the eye, assuring no visual interference with the wearer. The indicator is visible when the lens is not being worn, and, depending on the color of the indicator, may be more or less conspicuous while being worn. In other words, the color may contrast with that of a lens, or a user's iris, or the color of the indicator may be more compatible with that of the lens. The manufacturer can continue to supply sample lenses, confident they will not be diverted, and thus a wearer may sample several lens colors or styles to determine the cosmetic effect of the lens. In terms of manufacture, the sample indicator may be imprinted in an existing step in a color-printing process, or the sample indicator may be imprinted in a separate step. The color and formulation of the inks used to imprint the sample indicator will likely determine how many steps of printing are required.

DETAILED DESCRIPTION

U.S. Pat. No. 4,582,402, assigned to the assignee of the present invention, discloses a method of printing contact lenses on selected areas of the lens, imprinting dots or other small geometric patterns, such as hexagons. The patent teaches that the entire surface of the lens need not be covered, only a part of the surface. Further improvements revealed in other patents, listed above, include larger patterns that are useful in enhancing a cosmetic effect for the wearer of the lenses. The sample indicator of the present invention is useful in deterring unauthorized use of samples of such lenses.

Figure 1:
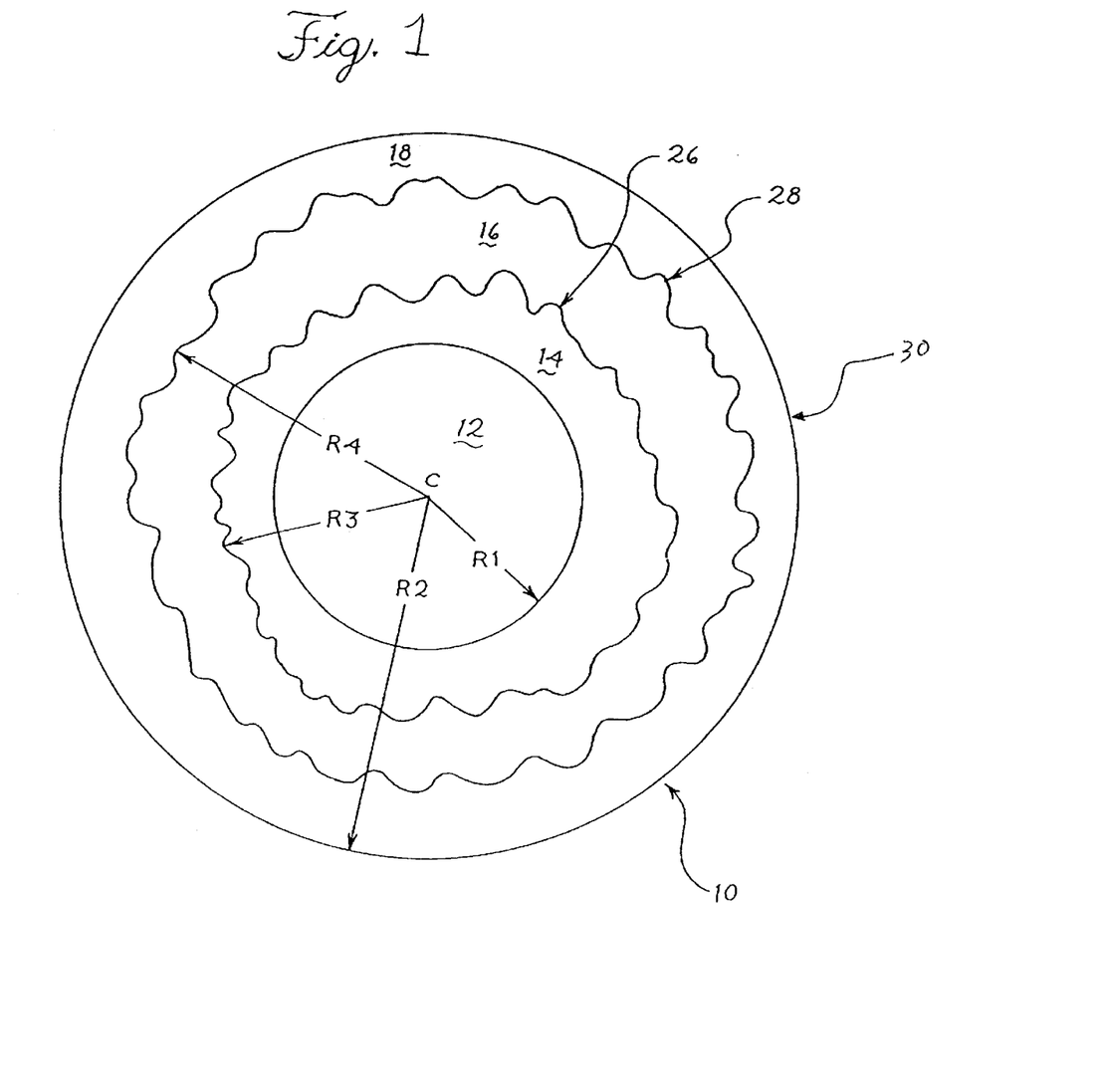
FIG. 1 is a top view of a contact lens depicting areas normally considered in imparting a color scheme to the contact lens.

It is convenient to think of contact lenses as consisting of areas as outlined in FIG. 1, having an inner area 12 corresponding to the pupil of the eye. This area is not printed in order not to interfere with the transmission of light to the pupil of the eye. Surrounding the pupil is the iris, comprising respectively an inner iris region 14 and an outer iris region 16, and an outer periphery 18. The periphery 18 is the area outside the iris and surrounding the iris. This area corresponds to the sclera of the eye. In FIG. 1, the border 28 marks the end of the iris section and the beginning of the peripheral area of the contact lens, while border 30 marks the outer edge of the contact lens. R1 is the radius of the pupil area of the contact lens, about 2.2 to about 2.6 mm, and preferably about 2.5 mm.

The radius of the outer periphery of the average iris on the lens, R2, is about 5.2 to about 6.8 mm, preferably about 6.75 mm. R3, the radius of the inner periphery of the iris zone, is a jagged edge, and will vary between 3.3 and 3.7 mm, with an average of about 3.5 mm, While a jagged edge will yield a more natural appearance after printing, the border of the inner periphery of the iris may also be a substantially circular curve, with an average radius of about 3.5 mm. R4 is the radius of the outer periphery of the iris zone of a contact lens, about 4.8 to 5.2 mm, and preferably averaging about 5.0 mm, with substantial irregularity, as shown in the figure. While a jagged edge will yield a more natural appearance, R4 may also be a substantially circular curve, with a radius of about 5.0 mm. The peripheral area of the lens, area 18, lies outside the iris area. It is in this area, between outer iris periphery 28 and the outer border 30 of the contact lens, that the marking or the sample indicator is preferably located.

Figure 2:
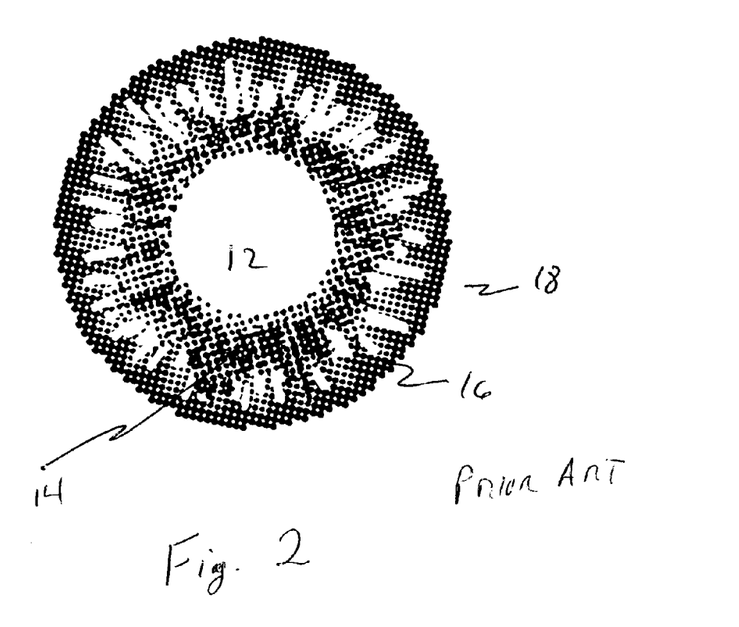
FIG. 2 is a top view of a conventional pattern used to color a contact lens by combining an inner starburst pattern (FIG. 8) and an outer starburst pattern (FIG. 9).
Figure 3:
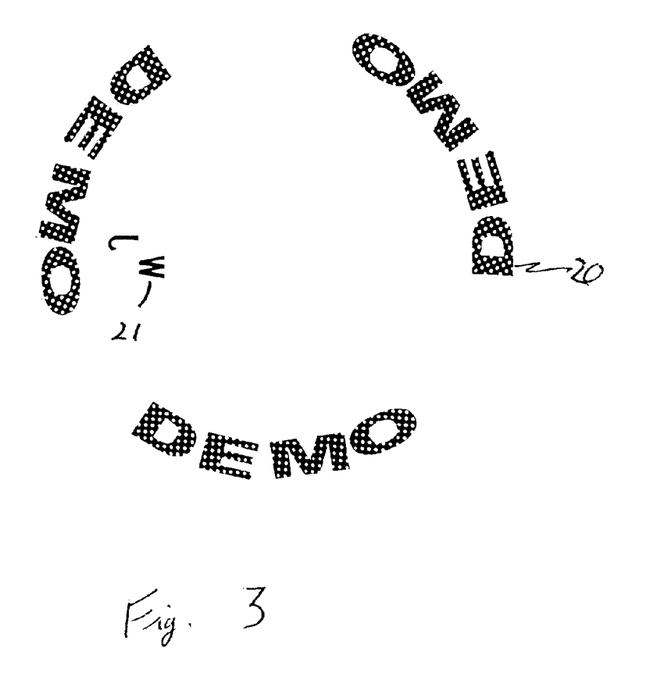
FIG. 3 is a top view of a sample indicator that may be imprinted on a colored or non-colored contact lens according to the present invention.
Figure 4:
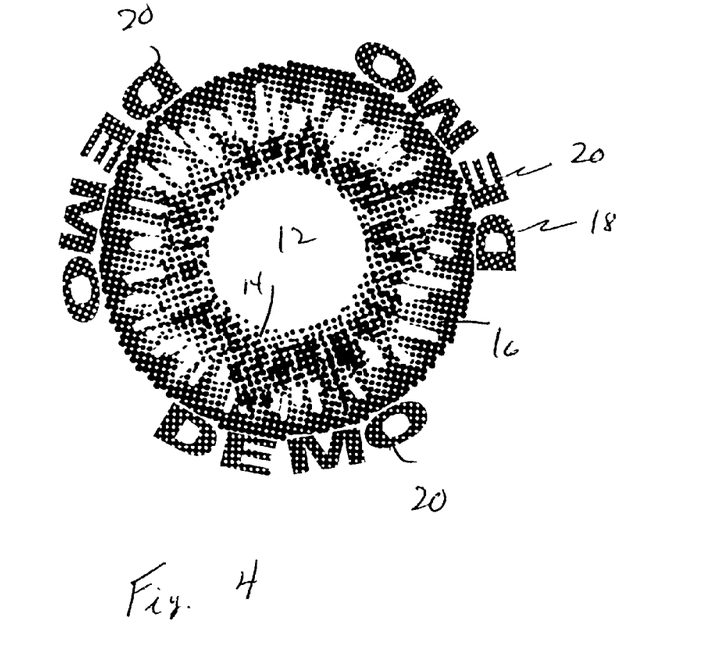
FIG. 4 is a top view of a pattern with a sample indicator for a colored contact lens.

FIG. 2 is a top view of a conventional imprinted area on a contact lens in accordance with the above geometries. Patterns of dots and lines may be viewed in the figure, both in embodiments having color elements and those not having color elements. The pupil 12 is not imprinted, while the inner iris 14 and the outer iris 16 are imprinted, with variations and even macro-striations visible in the central printed area. The outer area 18 is not printed. These variations are effective in imparting depth and texture to the color of a user's iris when viewed by an observer at a normal distance, about 5 feet, from the user. FIG. 3 is a top view of sample indicator 20, and a manufacturer's symbol 21 according to the present invention, to be imprinted in the peripheral area of the contact lens. The contact lens may be colored or non-colored. FIG. 4 is a top view of the sample indicator 20 imprinted on the peripheral area 18 of the lens in conjunction with a coloring pattern imprinted in the iris areas 14,16 of the lens. The imprinting of the sample indicator does not interfere with the pupil area 12 of the lens at the center, nor does it interfere with the coloring pattern discussed above and shown in FIG. 2.

Figure 5A:
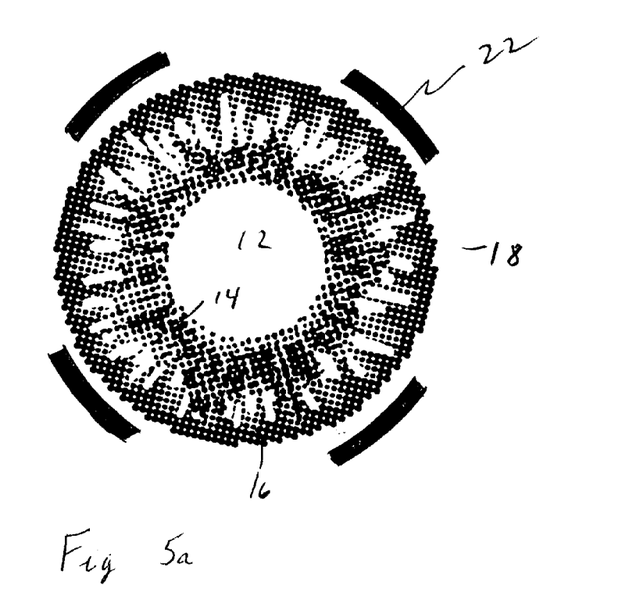
FIGS. 5a and 5b are top views of sample indicators and color patterns for contact lenses.
Figure 5B:
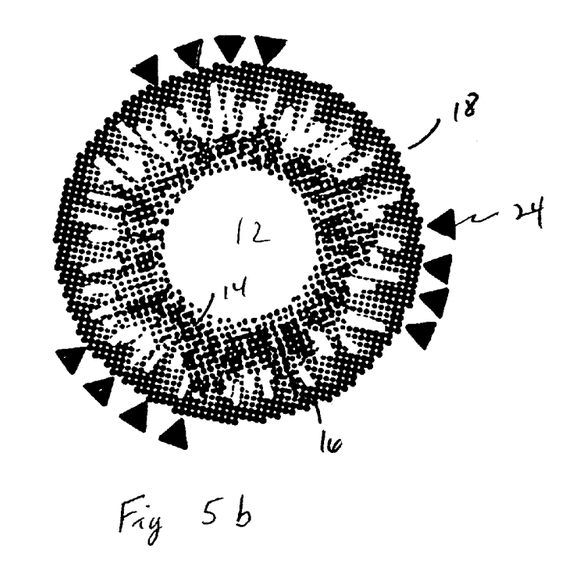

While the sample indicator used in FIG. 4 is the word "DEMO", the sample indicator could as well be any other word, phrase or symbol that would suggest a demonstration or sample item. These could include the words "Not for Sale", "Sample", "Model", and even "Demonstration Only". Symbols effective for such use might include a series of symbols such as "XXXXX" imprinted in several areas in the periphery of the lens, or a solid bar in a radial or circumferential pattern, such as one about 0.2 to 2.0 mm thick and about 0.5 to 5.0 mm long, imprinted one or more times in the periphery of a lens. A bold color contrasting with that of the iris or the sclera of the eye may be effective here, especially a dark, opaque color, such as black. Examples are shown in FIG. 5a with circumferential bars 22 and FIG. 5b with triangular symbols 24. Any indicator that would suggest a sample or demonstration item is within the scope of the invention.

Colorants used to color contact lenses may be used for the sample indicator. Such colorants must be safe for use in human eyes, and are subject to approval by the U.S. Food and Drug Administration. Included in acceptable and useful colorants are conventional pigments and dyes. Also useful are new classes of pigments, such as pearlescent pigments and fluorescent pigments, which impart unique tones and colors to the contact lenses. Also useful in marking sample indicators are fluorescent dyes. Such pigments and dyes may be used singly or in combinations to produce desirable colors and shades, in ways well known to those skilled in the art.

Figure 6:
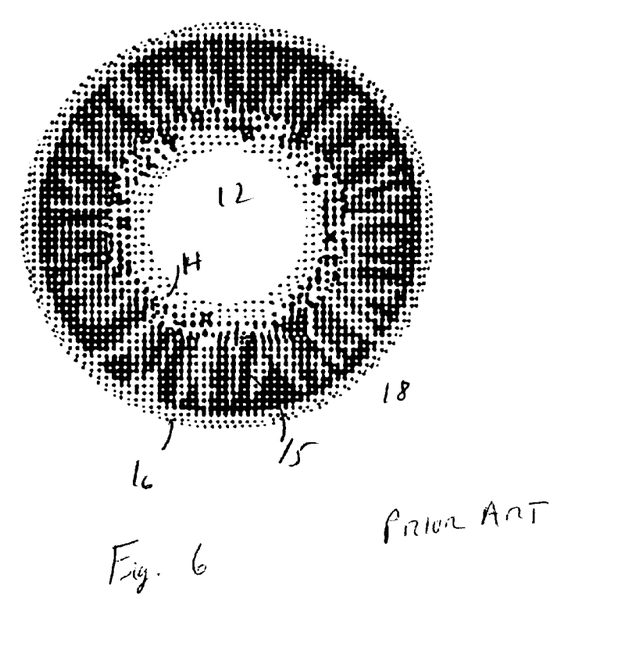
FIG. 6 is a top view of a conventional pattern used to color a contact lens.
Figure 7:
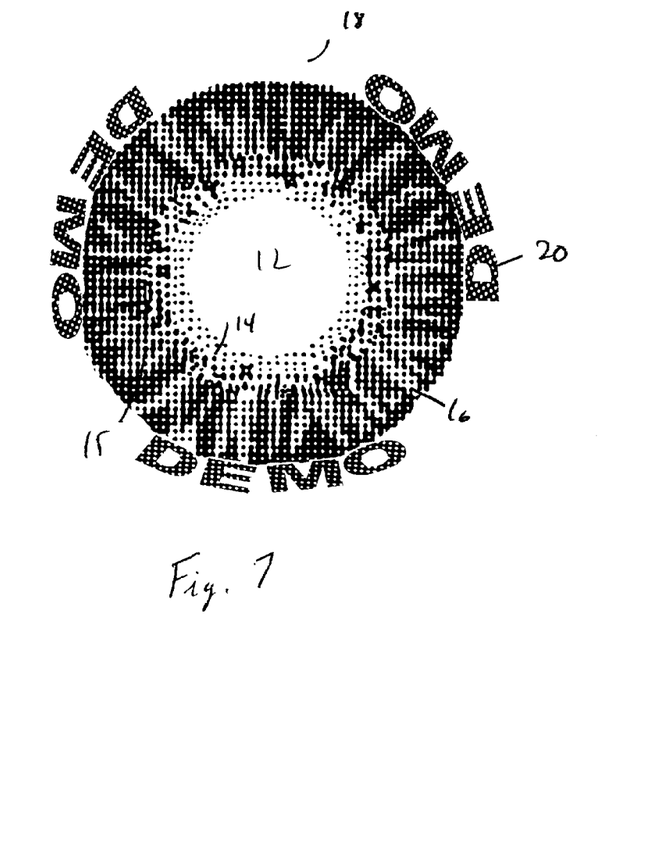
FIG. 7 is a top view of a pattern with a sample indicator for a contact lens.

The lenses covered in this invention are not limited to those with the color scheme of the previous several examples. FIG. 6 illustrates another conventional color scheme, in which the central area of the iris 15 is imprinted with much greater color density than the inner iris area 14 or the outer iris area 16. This particular color scheme features a variation of color coverage different from that of the previous example, one that may be advantageously applied by a single-step imprinting process. Such a simple process may be advantageously used to imprint the sample indicator shown in FIG. 3. The combination of the sample indicator of FIG. 3 and the color pattern of FIG. 6 is shown in FIG. 7, in which the sample indicator 20 is shown in the peripheral area 18 of the lens, while the color-enhancing portion is shown generally in the areas 14, 15, 16 of the lens to be superimposed on the iris of the user's eye. As in the previous examples, other words or indicia of a sample may be used, and the area 12 of the lens corresponding to the pupil of the eye is not imprinted.

The invention disclosed here also covers a method of marking the contact lens with the sample indicator. In a single step printing process, the lens may be imprinted simultaneously with the color scheme. Alternatively, the sample indicator may be printed separately. Some contact lenses use more than one step of imprinting in order to provide more sophisticated visual effects. In one conventional method, several steps are used to imprint, one for each color and sometimes more than one in order to give the proper aesthetic effect furnished by variations in the density of colors afforded by these processes. In any of these processes, the sample indicator may be added to an existing step, or may added in a separate printing step. There may an advantage to a using separate step for imprinting the sample indicator, especially if it is desired to mark the sample indicator in a color that will stand out in contrast to the sclera of the eye, such as white, or black, or bright red, or other unusual, contrasting color.

Such color schemes tend to reveal the sample status of the lens to an observer of the lens wearer. It may also be desirable to alert the wearer to the sample status of the lens with a less garish color scheme. One purpose is to alert the wearer to the sample status of the lens, but not to make the indicator so vivid as to destroy the value of the lens as a sample for its selling purposes. Marking the lens with a color compatible with the lens alerts the wearer but does not make the lens garish. With such a color, the wearer preparing to insert the lens into an eye will be aware that the lens is a sample. However, the lens with such a sample indicator will not appear so garish or unusual as to detract from the wearer's appreciation of the color scheme of the lens. Thus, contact lenses may be marked as samples with a color compatible with that of the lens for some purposes, and may be marked with highly contrasting colors for other purposes. The invention includes both types of markings. The invention also includes the marking of non-colored lenses with these sample indicators.

Figure 8:
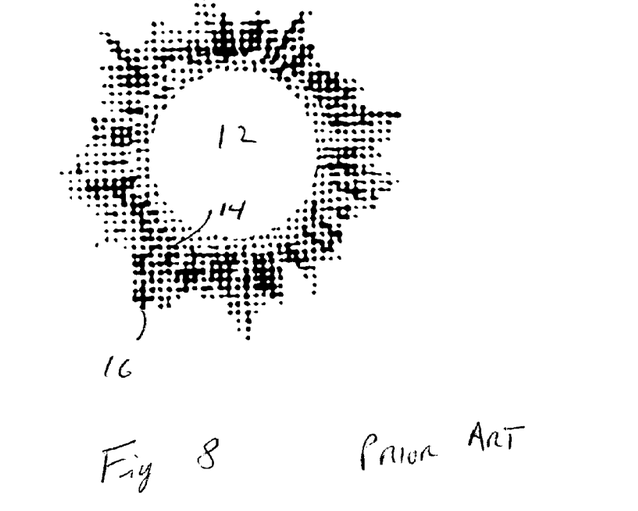
FIG. 8 is a top view of a conventional inner starburst pattern used to color a contact lens.
Figure 9:
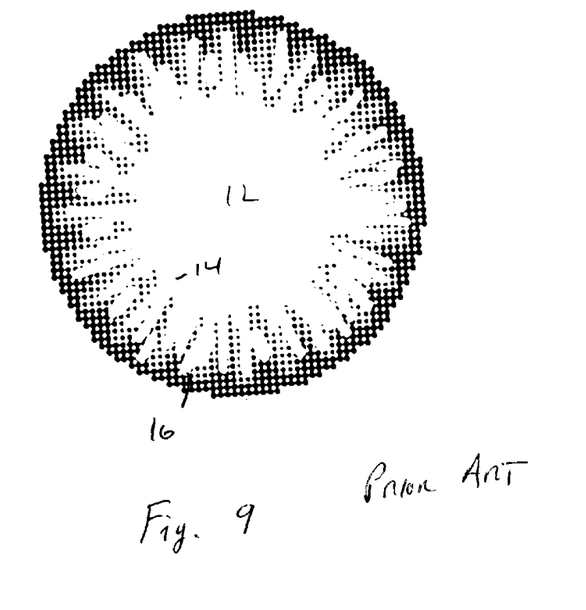
FIG. 9 is a top view of a conventional outer starburst pattern used to color a contact lens.
Figure 10:
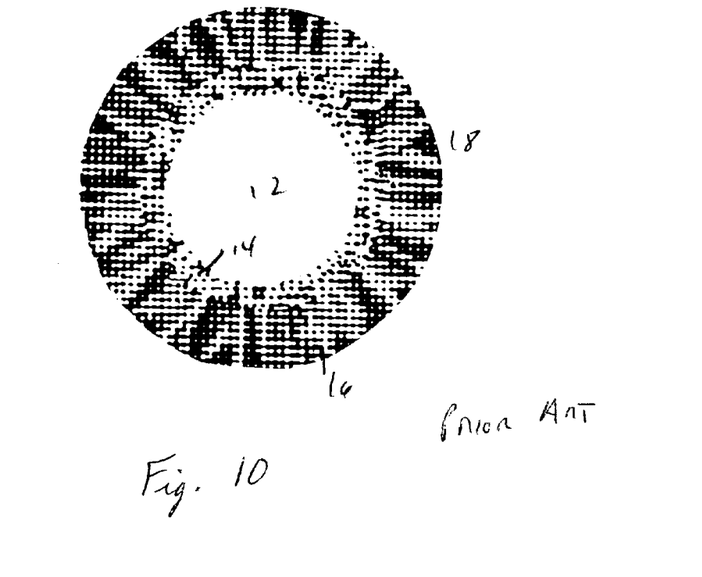
FIG. 10 is an iris pattern that may be used in combination with the inner and outer starburst patterns of FIG. 8 and FIG. 9 respectively.

Other color schemes may be used besides the ones mentioned above. In one embodiment of the invention, a contact lens is colored in a multi-step process with overlapping or partially overlapping areas. FIG. 8 depicts an area of a contact lens conventionally printed in one step of such a process, an "inner starburst," an area of the lens to be superimposed on the inner portion 14 of the iris of the wearer, with only a small portion of the outer iris 16 imprinted, and the pupil area 12 not printed at all. FIG. 9 depicts a "starburst" to be printed on the outer portion 16 of the iris of a contact lens. A difference in color, or color density, can be discerned in FIG. 9 between inner portion 14 and outer portion 16, here depicted with darker color of greater color density toward the outer portion, though that is not essential. FIG. 10 depicts an iris pattern which may be used in combination with the inner and outer starburst patterns of FIG. 8 and FIG. 9 respectively, to achieve a more natural look for the iris of the wearer, yielding greater depth and texture to the appearance of the iris, due to the several colors and several steps used in printing the colors. Periphery 18 is not imprinted.

Figure 11:
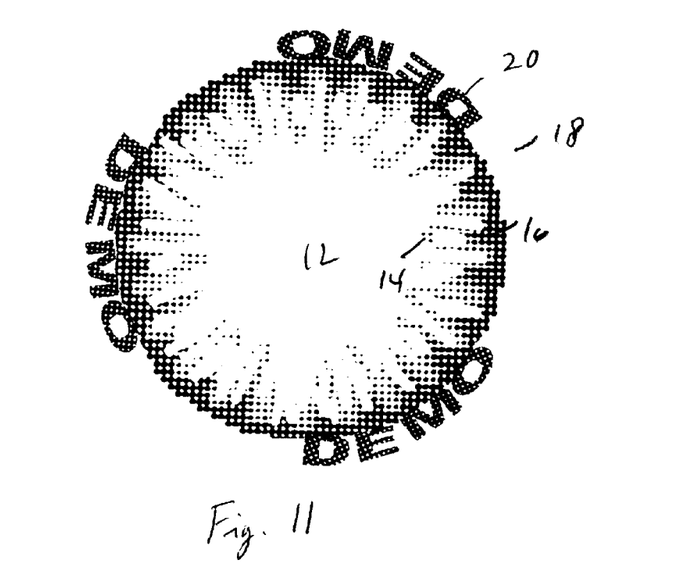
FIG. 11 is a top view of an "outer starburst" pattern incorporating a sample indicator according to the present invention.
Figure 12:
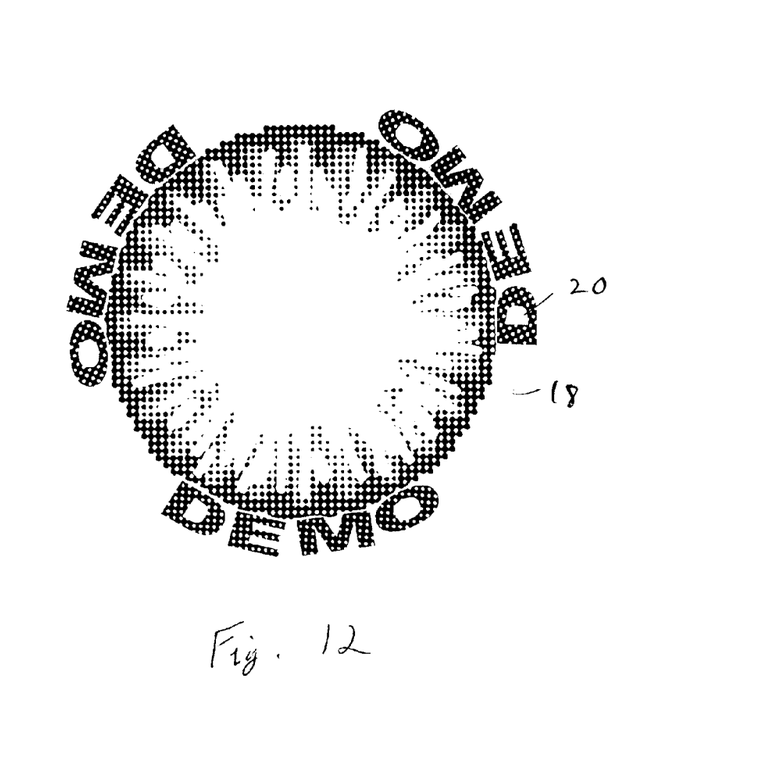
FIG. 12 is a top view of an "outer starburst" pattern and a sample indicator according to the present invention, wherein the sample indicator is of a different relative size.

FIG. 11 depicts the application of the invention to an outer starburst, primarily in area 16 and to a lesser extent in area 14, here adding the indicator "Demo" 20 in area 18 on the periphery of the lens, in readable type. This figure is meant to demonstrate that the sample indicator may be added in an existing step, especially if the color desired is the color already used to imprint the lens. Alternatively, the sample indicator 20 may be printed in a separate, additional step, if the added cost will yield a process advantage or a better sample indicator. FIG. 12 provides another example, in which the sample indicator is imprinted on the periphery 18 of the lens, this time in rather larger typeface, rendering the sample indicator even more visible than in FIG. 11.

It will be obvious, in light of these examples, that the sample indicator may be made as discreet or as bold as desired, depending on the perceived needs of the manufacturer adding the sample indicator. Thus, the indicator may be imprinted in a color compatible with that of the lens, or contrasting with that of the lens. If the lens is not colored, the sample indicator may be imprinted in a bold or in a discrete color. In addition, the indicator may be made larger or smaller, depending on the manufacturer and the deterrent effect desired. In one embodiment, the sample indicators may be, made large and dark and meant for the placement over the sclera of the eye for maximal effect; in another embodiment, the sample indicators may be made light blue and placed partially within the area of the contact lens meant to be superimposed over the iris and partially at the periphery of the lens.

In addition, other color schemes besides these may be proposed for contact lenses. The invention is meant to include all embodiments of colored lenses incorporating a sample indicator. This includes the colors mentioned above, whether applied in a single step or in more than one step, and wherein the sample indicator is added through an existing step or an additional step. It is meant to include variations on these colors, including applications with solid colors, mixtures of colors, and colors with densities varied according to those with skill in the art, wherein only a part of the surface is imprinted with the desired colors. The invention also comprises colors incorporating a design, whether a geometric pattern formed from color, or a design of objects using color, such as the "Wild Eyes" designs belonging to the assignee of the present application. The color white may be used in indicators according to the present invention.

While this invention has been shown and described in connection with the preferred embodiments, it is apparent that certain changes and modifications, in addition to those mentioned above, may be made from the basic features of this invention. For example, any letter or symbol may be used repetitively to mark the lens as a sample without departing from the invention. Any indicator that would suggest a sample or demonstration item is meant to be included. Accordingly, it is the intention of the applicants to protect all variations and modifications within the valid scope of the present invention. It is intended that the invention be defined by the following claims, including all equivalents.

We claim:

1. A demonstration contact lens comprising a contact lens and a sample indicator imprinted thereon, wherein the sample indicator is selected from the group consisting of "Sample", "Not For Sale", "Not for Resale", "Model", "Demo", and "Demonstration Only", said sample indicator being imprinted in an area of the lens outside of an area superimposed on a pupil of an eye, said imprinting in a color selected from the group consisting of a color contrasting with that of the lens and a color similar to that of the lens.

2. The lens of claim 1, wherein the imprinting is in a color similar to that of the lens.

3. The lens of claim 1, further comprising a symbol indicative of the my manufacturer of the lens.

4. A sample contact lens, comprising a polymeric lens and a sample indicator imprinted thereon, wherein the sample indicator is a word or phrase selected from the group consisting of "Sample", "Not for Sale", "Not for Resale", "Model", "Demo", "Demonstration Only", and combinations thereof.

5. A sample contact lens, comprising a polymeric lens and a sample indicator imprinted thereon, wherein the sample indicator is a word or phrase, and wherein the lens is colored by imprinting in an area superimposed on an iris of a wearer, said area having a jagged edge and surrounding a non-opaque area for a pupil of an eye of the wearer, said imprint incorporating one or more colorants selected from the group consisting of conventional pigments, conventional dyes, pearlescent pigments, fluorescent pigments and fluorescent dyes.

6. A method of marking contact lenses, comprising:
    a) holding a lens in a fixed position; and
    b) imprinting a sample indicator thereon, wherein the indicator is a word or phrase selected from the group consisting of "Sample", "Not for Sale", "Not for Resale", "Model", "Demo", "Demonstration Only" and combinations thereof.

7. The method of claim 6, further comprising a step of coating the lens.

8. The method of claim 6, further comprising a step of covering the lens with a transparent cover.

* * * * *